March 25, 1930. E. H. BRISTOL 1,752,059
RECORDING INSTRUMENT
Filed April 11, 1928

Inventor:
Edgar H. Bristol
by Emery, Booth, Janney & Varney
Att'y

Patented Mar. 25, 1930

1,752,059

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

RECORDING INSTRUMENT

Application filed April 11, 1928. Serial No. 269,258.

This invention relates to recording instruments, such, for example, as recording pressure gages and recording thermometers, and more particularly relates to the means for holding the usual changeable paper chart or record disc used on such instruments, and the object is to provide a device of this character which may be rapidly manipulated with little or no strain on the time movement by which it is driven.

My invention will best be understood by reference to the following description of the recording instrument shown by way of example in the accompanying drawings in which a structure illustrative of my invention is embodied. In these drawings:—

Figure 1:
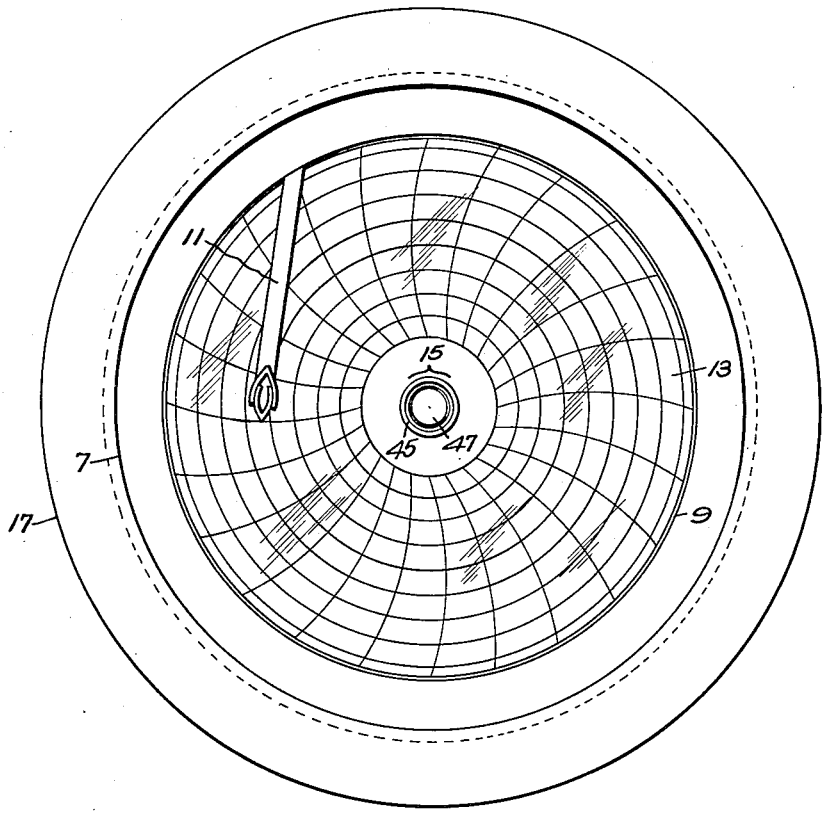
Figure 2:
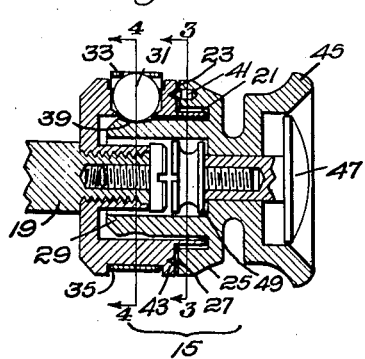
Figure 3:
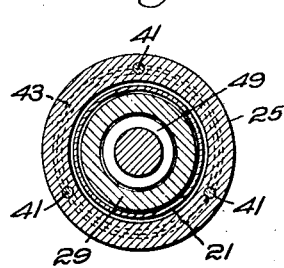
Figure 4:
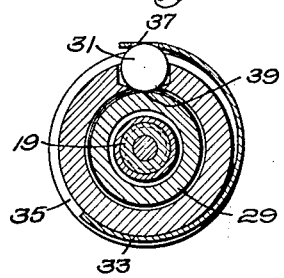

Fig. 1 is a front elevation of a recording instrument;

Fig. 2 is a central vertical section through the chart-holding mechanism on an enlarged scale; and Figs. 3 and 4 are sections on the lines 3—3 and 4—4 of Fig. 2 respectively.

Referring to the drawings, I have there shown a recording instrument of well known form embodying a casing 7, the front of which is closed by a dial plate 9 and which houses a suitable clock movement and a suitable measuring instrumentality such, for instance, as a helical Bourdon tube or a set of diaphragms. The measuring instrumentality operates the pen 11 which swings over the dial plate 9 and is adapted to record the conditions measured on the paper chart 13 which is secured as by means of the chart hub 15 to the time shaft of the clock movement to rest against and rotate over the dial plate 9. The instrument would ordinarily be provided with a suitable glazed door 17.

Referring to Fig. 2, the hub 15 by which the chart is secured to the time shaft 19 may consist of an inner part secured to that shaft and an outer removable cap. The former essentially is the outer end of the shaft driven by the time movement suitably formed to receive the chart and preferably comprises a cylindrical barrel portion 21 adapted to pass through the central opening of the chart, which latter may be placed over this barrel portion freely by a simple movement of axial approach and at the inner end of this barrel portion there is provided a shoulder 23 against which the chart may be pressed. This may be effected by a removable cap which preferably includes a sleeve 25 adapted to surround the barrel portion 21, the sleeve having an annular shoulder 27 opposing shoulder 23, the chart being held between these two shoulders.

To secure the removable cap embodying the sleeve 25 upon the inner member of the hub the latter may be hollowed out to receive a stem 29 on the cap, a suitable spring catch being provided for engaging the stem within the hollow of the inner element, this catch being preferably arranged to exert a longitudinal tension on the removable cap to effect a clamping pressure between the opposed shoulders 23 and 27. In the present embodiment of the invention the catch is formed by a ball 31 housed in a suitable recess in the inner element so that it projects into the hollow therein, which ball is normally pressed inwardly by a suitable spring, conveniently in the form of a flat spring 33 in extent somewhat greater than a semi-circle, which clasps around the inner element of the hub, preferably being housed in an annular groove 35 therein. The end of the spring 33 bears upon the ball 31 and may be provided with a hole 37 receiving the convex surface of the ball to aid in positioning the parts. The ball may engage in a suitable recess 39 in the stem 29 of the removable cap, this recess preferably being an annular groove as shown to permit engagement of the parts irrespective of the relative angular position thereof and for other purposes which will appear hereafter. The end of the stem 29 may, as shown in Fig. 2, be provided with a coned inner end cooperating with the convex surface of the ball to provide a mutual camming action facilitating the interengagement of the parts. The rounded surface of the ball entering the groove 39 likewise tends to draw the cap toward the left in Fig. 2, pressing shoulder 27 against shoulder 23, and may grip the chart with sufficient tightness to insure proper driving of the same from the time shaft. In the preferred embodiment of the invention herein shown the single ball 31 provides a laterally acting catch tending to press stem 29 laterally (downwardly in Fig. 2) into frictional engagement with the wall of the recess in the inner hub element. By this frictional engagement driving of the cap by the inner element carried by the time shaft 19 is assured. To ensure rotation of the chart suitable means are provided whereby the cap grips the same and I have herein shown teeth 41 formed on shoulder 27 of the sleeve 25, the teeth being adapted to pierce the chart when the cap is applied.

The chart as used on these instruments is ruled with suitable lines usually designated with the hours of the day or other time periods. Obviously if a chart is placed on the instrument at nine o'clock in the morning, it should be so positioned that the pen will coincide with the nine o'clock line on the chart. In the present instance provision is made permitting angular adjustment of the chart after it has been secured in position on the time shaft. For this purpose the cap or outer member of the chart hub is arranged for rotative movement relatively to the time shaft without relaxation of the hold on the chart and means are provided whereby the chart may be rotated with this outer member or cap independently of movement of the time shaft. As has already been noted, the cap may be manually rotated relative to the inner element of the hub on the time shaft because the ball 31 engages in annular groove 39 in the stem 29 of the cap. Rotative adjustment of the cap to control the angular position of the chart is provided for by the teeth 41 formed on the shoulder 27 which pierce the chart. An annular groove 43 in the shoulder 23 of the inner member receives the teeth 41 and permits rotative movement of the sleeve. Thus, if the sleeve is rotated, the chart will likewise be rotated by the teeth 41 which grip the same yet it will be held in the position of adjustment to which it is brought by this rotation and will be rotated by the time shaft at normal speed as soon as the adjusting movement is stopped since the cap which grips the chart by means of the teeth 41 is frictionally clutched to the shaft with sufficient firmness to effect driving without slippage.

What I have just described by way of illustrative example is described and claimed in my co-pending application, Serial No. 35,352, filed June 6, 1925. In such a structure wherein the cap of the chart-holding means engages by a snap action, obviously it may be very quickly applied or removed. However, it will be seen that if the cap is pulled to disengage it, as by engaging the fingers behind a peripheral flange 45 thereon, herein an annular flange, considerable longitudinal strain will be placed upon the shaft 19. The engaging action may be made relatively easy as the coned end of the stem 29 may have a gentle angle, but to hold the cap by means of the ball 31 a relatively abrupt shoulder is required in the groove 39. In accordance with my present invention I provide means permitting withdrawal of the cap without strain on the time shaft due to the unsnapping of the spring catch and in the embodiment of the invention shown this is effected by the provision of means which may be manipulated to steady the clock movement shaft and support it against the strain, such means being preferably arranged for operation during the act of withdrawal and substantially as a part of the same manipulative movement.

In the embodiment of my invention herein shown there is slidably mounted on the cap centrally thereof a push-button or plunger 47 having an enlarged head disposed at the outer face of the cap. A screw 49 may serve to retain the plunger in position and form an inner head opposing the outer end of the shaft 19, as clearly shown in Fig. 2, the whole being free for a limited axial movement relative to the cap, such movement being limited by the two heads at opposite ends thereof. Assuming the parts to be engaged, as shown in Fig. 2, to remove the cap the index and middle fingers may conveniently be hooked beneath the flange 45 and the thumb will engage the head of the plunger and depress it toward the left in that figure until it bears against the shaft 19. A continued closing movement of the fingers and thumb will then gently release the cap without excessive longitudinal strain on the shaft 19 and consequent jar to the time movement.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. In a recording instrument, in combination with a clock-driven inner member for supporting a chart at an end thereof, a removable cap for securing the chart thereto having snap engagement therewith, and an element loosely associated with said cap and manipulable to engage and steady said inner member during removal of the cap.

2. In a recording instrument, in combination with a clock-driven inner member for supporting a chart at an end thereof, a removable cap for securing the chart thereto having snap engagement therewith, and means providing for the disengagement and removal of the cap comprising an inwardly movable push-button adapted to be depressed by the pressure of a finger and a part so relatively positioned thereto as to permit it to be grasped by other fingers of the same hand to withdraw the cap by movement relative to said button.

3. In a recording instrument, in combination with a clock-driven inner member for supporting a chart at an end thereof, a removable cap for securing the chart thereto having snap engagement therewith, said cap being peripherally flanged to permit it to be grasped for withdrawal (as by the index and middle fingers) and carrying a centrally located plunger opposing said inner member and depressible relatively thereto (as by the thumb) into engagement with said inner member to support the same against the strain of withdrawal.

In testimony whereof, I have signed my name to this specification.

EDGAR H. BRISTOL.